United States Patent
Huang

(10) Patent No.: US 10,726,579 B1
(45) Date of Patent: Jul. 28, 2020

(54) LIDAR-CAMERA CALIBRATION

(71) Applicant: Honda Motor Co., Ltd., Tokyo (JP)

(72) Inventor: Jiawei Huang, San Jose, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/683,062

(22) Filed: Nov. 13, 2019

(51) Int. Cl.
| | |
|---|---|
| *H04N 7/18* | (2006.01) |
| *H04N 17/00* | (2006.01) |
| *G06T 7/80* | (2017.01) |
| *G01S 7/497* | (2006.01) |
| *G01S 17/42* | (2006.01) |
| *G01S 17/86* | (2020.01) |
| *G05D 1/02* | (2020.01) |

(52) U.S. Cl.
CPC .............. *G06T 7/80* (2017.01); *G01S 7/4972* (2013.01); *G01S 17/42* (2013.01); *G01S 17/86* (2020.01); *H04N 17/002* (2013.01); *G05D 1/0231* (2013.01); *G06T 2207/10028* (2013.01); *G06T 2207/20101* (2013.01); *G06T 2207/30244* (2013.01); *G06T 2207/30252* (2013.01)

(58) Field of Classification Search
CPC ...... H04N 7/183; H04N 17/002; H04N 17/00; G01S 17/42; G01S 17/86; G01S 7/4972; G01S 7/497; G06T 2207/10028; G06T 2207/30252; G06T 2207/201; G06T 2207/30244; G06T 7/80; G05D 1/0231
USPC ........................ 348/148, 143, 180, 187, 188
See application file for complete search history.

(56) References Cited

U.S. PATENT DOCUMENTS

| | | | |
|---|---|---|---|
| 9,424,650 B2 | 8/2016 | Van Baar et al. | |
| 9,872,010 B2 | 1/2018 | Tran et al. | |
| 10,269,141 B1 | 4/2019 | Shotan | |
| 2006/0290920 A1 | 12/2006 | Kampchen et al. | |
| 2014/0240501 A1* | 8/2014 | Newman | H04N 7/183 348/148 |
| 2018/0096493 A1 | 4/2018 | Bier | |
| 2018/0336697 A1* | 11/2018 | Lu | G01S 17/86 |
| 2018/0356824 A1 | 12/2018 | Wang et al. | |

(Continued)

FOREIGN PATENT DOCUMENTS

| | | |
|---|---|---|
| EP | 3438777 A1 | 2/2019 |
| WO | 2018142057 A1 | 8/2018 |

OTHER PUBLICATIONS

Ranjith Unnikrishnan, Martial Hebert, "Fast Extrinsic Calibration of a Laser Rangefinder to a Camera", CMU-RI-TR-05-09, Jul. 2005, pp. 1-23.

*Primary Examiner* — Sherrie Hsia

(74) *Attorney, Agent, or Firm* — Honda Patents & Technologies North America, LLC; Aaron C. Fong

(57) ABSTRACT

A calibration system and method for Light detection and Ranging (LiDAR)-camera calibration is provided. The calibration system receives a plurality of images that includes a calibration pattern and a plurality of point cloud data (PCD) frames that includes the calibration pattern. The calibration system extracts a first normal to a first plane of the calibration pattern in a first PCD frame of the received plurality of PCD frames and further extracts a second normal to a second plane of the calibration pattern in a first image frame of the received plurality of image frames. The calibration system computes a transform between the extracted first normal and the extracted second normal and based on the computed transform, calibrates the LiDAR sensor with the camera.

20 Claims, 6 Drawing Sheets

(56) References Cited

U.S. PATENT DOCUMENTS

| | | |
|---|---|---|
| 2018/0356831 A1 | 12/2018 | Luo et al. |
| 2018/0357314 A1 | 12/2018 | Wang et al. |
| 2019/0065863 A1 | 2/2019 | Luo et al. |
| 2019/0082156 A1 | 3/2019 | Zhang et al. |
| 2019/0120947 A1 | 4/2019 | Wheeler et al. |

* cited by examiner

LIDAR-CAMERA CALIBRATION

BACKGROUND

With advancements in many technologies, such as self-driving technology and autonomous robotics, there has been a rise in adoption of heterogeneous multi-sensor systems that include a combination of sensors, such as Light Detection and Ranging (LiDAR), Radar, ultrasound sensors, and cameras. Typically, a heterogeneous multi-sensor system may be used by a robot or a vehicle to sense and understand the surrounding environment so as to make accurate decisions related to different tasks, such as driving or navigation. The heterogeneous multi-sensor system may produce sensor data streams which are different from each other based on, for example, temporal or spatial resolution, or geometric misalignment. It may be relevant to fuse outputs (sensor data streams) of individual sensors of the heterogeneous multi-sensor system to produce optimal inferences or decisions for tasks related to the vehicle or the robot.

Further limitations and disadvantages of conventional and traditional approaches will become apparent to one of skill in the art, through comparison of described systems with some aspects of the present disclosure, as set forth in the remainder of the present disclosure and with reference to the drawings.

SUMMARY

An exemplary aspect of the disclosure provides a calibration system. The calibration system may include control circuitry communicatively coupled to a sensor system comprising a Light Detection and Ranging (LiDAR) sensor and a camera. The control circuitry may receive a plurality of image frames that includes a calibration pattern. The control circuitry may further receive a plurality of point cloud data (PCD) frames that also include the calibration pattern. The control circuitry may extract a first normal to a first plane of the calibration pattern in a first PCD frame of the received plurality of PCD frames. Similarly, the control circuitry may further extract a second normal to a second plane of the calibration pattern in a first image frame of the received plurality of image frames. Between the extracted first normal and the extracted second normal, the control circuitry may compute a transform. The computed transform may include final values of extrinsic calibration parameters for the sensor system. Based on the computed transform, the control circuitry may calibrate the LiDAR sensor with the camera.

Another exemplary aspect of the disclosure provides a calibration system which may include a sensor system that includes a Light Detection and Ranging (LiDAR) sensor and a camera. The calibration system may further include control circuitry communicatively coupled to the sensor system. The control circuitry may receive a plurality of image frames that includes a calibration pattern. The control circuitry may further receive a plurality of point cloud data (PCD) frames that also includes the calibration pattern. The control circuitry may extract a first normal to a first plane of the calibration pattern in a first PCD frame of the received plurality of PCD frames and extract a second normal to a second plane of the calibration pattern in a first image frame of the received plurality of image frames. Between the extracted first normal and the extracted second normal, the control circuitry may compute a transform. The computed transform may include final values of extrinsic calibration parameters for the sensor system. The control circuitry may transmit the extrinsic calibration parameters to an Electronic Control Unit (ECU) of a vehicle. Based on the extrinsic calibration parameters, the ECU may be configured to calibrate the LiDAR sensor with the camera. The LiDAR sensor may be calibrated while the sensor system in mounted on the vehicle and the vehicle may be in an operational state.

Another exemplary aspect of the disclosure provides a method in a calibration system communicatively coupled to a sensor system. The sensor system may include a Light Detection and Ranging (LiDAR) sensor and a camera. The method may include receiving a plurality of image frames including a calibration pattern and receiving a plurality of point cloud data (PCD) frames including the calibration pattern. The method may further include extracting a first normal to a first plane of the calibration pattern in a first PCD frame of the received plurality of PCD frames and extracting a second normal to a second plane of the calibration pattern in a first image frame of the received plurality of image frames. The method may further include computing a transform between the extracted first normal and the extracted second normal. The computed transform may include final values of extrinsic calibration parameters for the sensor system. The method may further include calibrating the LiDAR sensor with the camera based on the computed transform.

Figure 1:
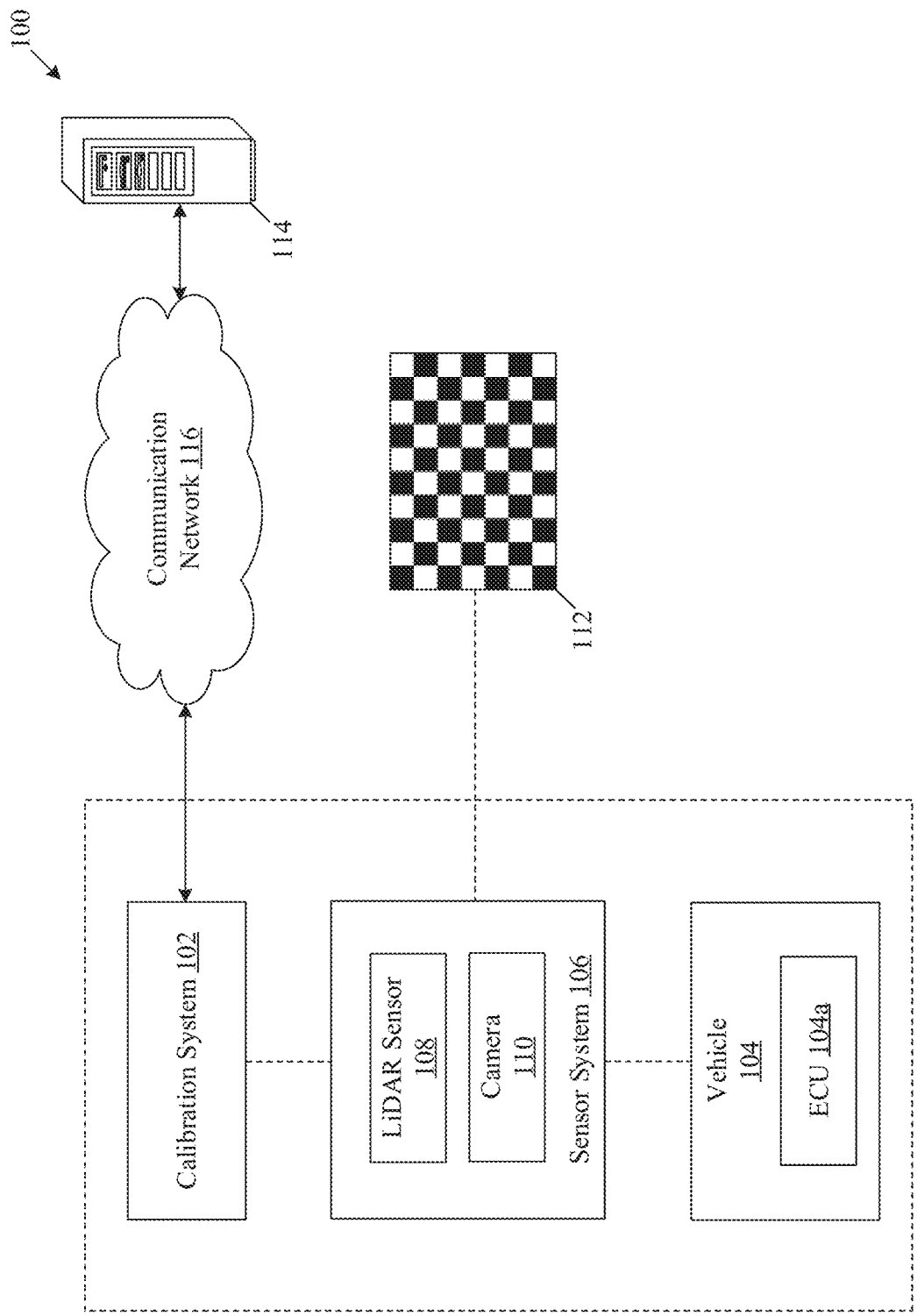
FIG. 1 illustrates an exemplary environment for camera to LiDAR calibration, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed calibration system for Light Detection and Ranging (LiDAR)-camera calibration. The disclosed calibration system relies on a LiDAR sensor and a camera associated with the LiDAR sensor to acquire Point Cloud Data (PCD) frames and image frames, respectively, of a target (e.g., a calibration pattern) from different viewpoints. At each viewpoint, the target is arranged at a particular viewing angle, a scale, or an orientation in a common field-of-view (FOV) of the LiDAR sensor and the camera.

The disclosed calibration system may determine a first plane of the calibration pattern in a PCD frame and a second plane of the calibration pattern in a respective image frame. The disclosed calibration system may then extract a first normal to the determined first plane and a second normal to the determined second plane. Between the extracted first normal and the second normal, the disclosed calibration system may compute a transform that includes final values of extrinsic calibration parameters for LiDAR-camera calibration. Based on the final values of the extrinsic calibration parameters, the LiDAR sensor may be calibrated with the camera. As the present disclosure merely relies on the extracted first normal and the second normal to find the final values of extrinsic calibration parameters, the calibration of the PCD frame to the image frame becomes computationally less expensive as compared to conventional point-wise calibration methods that rely on solving computationally expensive objective function(s) that map a large number of points of a PCD frame to an image frame.

FIG. 1 illustrates an exemplary environment for LiDAR-camera calibration, in accordance with an embodiment of the disclosure. With reference to FIG. 1, there is shown an exemplary network environment 100. In the exemplary network environment 100, there is shown a calibration system 102 and a vehicle 104 that includes an Electronic Control Unit (ECU) 104a. There is further shown a sensor system 106 that includes a Light Detection and Ranging (hereinafter, "LiDAR) sensor 108 and a camera 110. There is further shown a calibration pattern 112, a server 114, and a communication network 116 which may be established among the calibration system 102, the vehicle 104, the sensor system 106, and the server 114.

The calibration system 102 may include suitable logic, circuitry, interfaces, and/or code that may be configured to calibrate the LiDAR sensor 108 with the camera 110 based on computation of a transform associated with the LiDAR sensor 108 and the camera 110. Once calibrated, output from the LiDAR sensor 108 may be fusible with output from the camera 110 to obtain fused sensor data. The fused sensor data may be a multimodal representation of the surrounding environment and may provide an enriched description of the surrounding environment and/or object(s) of interest in the surrounding environment. Examples of the calibration system 102 may include, but are not limited to, an application server or a web server, a cloud server (or a cluster of cloud servers), a factory server, a consumer-electronic (CE) device, a laptop, a workstation, or an in-vehicle ECU.

The vehicle 104 may be a non-autonomous vehicle, a semi-autonomous vehicle, or a fully autonomous vehicle, for example, as defined by National Highway Traffic Safety Administration (NHTSA). Examples of the vehicle 104 may include, but are not limited to, a two-wheeler vehicle, a three-wheeler vehicle, a four-wheeler vehicle, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. Examples of the vehicle 104 may include, but are not limited to, an electric car, an internal combustion engine (ICE)-based car, an electric car, a fuel-cell based car, a solar powered-car, or a hybrid car.

In at least one embodiment, the vehicle 104 may be one of an industrial robot (e.g., an articulated robot, a SCARA robot, a delta robot, and a cartesian coordinate robot), an agricultural robot, a mobile robot (e.g., a warehouse robot, an Automated Guided Vehicle (AGV), or an Autonomous Mobile Robots (AMR)), a telerobot, or a service robot.

The sensor system 106 may be a heterogeneous sensor system which includes at least the LiDAR sensor 108 and the camera 110 configured to be mounted on defined locations on the vehicle 104. The sensor system 106 may be configured to acquire multimodal sensor information of an environment surrounding the vehicle 104. The multimodal sensor information may include, for example, a plurality of image frames from the camera 110 and a plurality of Point Cloud Data (PCD) frames from the LiDAR sensor 108.

The LiDAR sensor 108 may include suitable logic, circuitry, interfaces, and/or code that may be configured to perform a 3D scan of a surrounding environment. For the 3D scan, the LiDAR sensor 108 may illuminate a target (such as the calibration pattern 112) with laser light pulses and measure a distance to the target based on reflected light pulses. Examples of the LiDAR sensor 108 may include, but are not limited to, a time-of-flight-based LiDAR sensor (hereinafter, "ToF"), an automotive LiDAR with a rotating assembly that creates a 360° field-of-view (FOV), a solid state LiDAR (e.g., Micro-Electro-Mechanical System (MEMS) LiDAR), Optical Phase Array (OPA) LiDAR, Frequency-Modulated Continuous Wave (FMCW) LIDAR, a coherent LiDAR, an incoherent LiDAR, a Flash LiDAR, and or any other variant with a suitable spatial resolution and FOV for automotive applications.

The camera 110 may include suitable logic, circuitry, and interfaces that may be configured to capture a plurality of images frames of the surrounding environment from a plurality of viewpoints. In an exemplary embodiment, the camera 110 may include at least one imaging unit, for example, an imaging sensor, a depth sensor, a Red-Green-Blue (RGB/RGBD) sensor), and/or an infrared (IR) sensor. Examples of the camera 110 may include, but are not limited to, a digital camera, 360-degree camera, an omnidirectional camera, a panoramic camera, an action camera, a wide-angle camera, a camcorder, a night-vision camera, a camera with a ToF sensor, and/or other camera devices with image capturing capability.

The calibration pattern 112 may be a two-dimensional (2D) reference pattern based on which the calibration system 102 may perform the LiDAR-camera calibration. Examples of the calibration pattern 112 may include, but are not limited to, a checkerboard pattern, a circular pattern, or a square pattern.

The server 114 may include suitable logic, circuitry, interfaces, and/or that may be configured to store final values of intrinsic and/or extrinsic calibration parameters associated with the calibration of the LiDAR sensor 108 with the camera 110. Based on instructions from the calibration system 102, the server 114 may share the final values with the vehicle 104 or with the sensor system 106. In some embodiments, the server 114 may be implemented as a cloud server, which may be utilized to execute various operations through web applications, cloud applications, HTTP requests, file transfer, and the like. Examples of the server 114 may include, but are not limited to, an application server, a cloud server, a web server, a database server, a file server, a mainframe server, or a combination thereof.

The communication network 116 may include a communication medium through which the calibration system 102, the vehicle 104, the sensor system 106, and the server 114 may communicate with each other. The communication network 116 may be one of a wired connection or a wireless connection Examples of the communication network 116 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the exemplary network environment 100 may be configured to connect to the communication network 116 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the calibration system 102 may initialize a process to perform the calibration of the sensor system 106, i.e., a calibration of the LiDAR sensor 108 with the camera 110. As part of the process, the calibration system 102 may generate control signals as instructions for the LiDAR sensor 108 and the camera 110 to acquire sensor information of the surrounding environment. An operator, such as a technician, may hold a board with the calibration pattern 112 and may slowly move to a plurality of viewpoints in the FOV of the LiDAR sensor 108 and the camera 110. Alternatively, the calibration system 102 may control a robotic system to hold the board with the calibration pattern 112 and move to the plurality of viewpoints in the FOV of the LiDAR sensor 108 and the camera 110. Herein, the calibration pattern 112 may be placed in a common FOV of the LiDAR sensor 108 and the camera 110. In some instances, when in the common FOV of the LiDAR sensor 108 and the camera 110, the board may be arranged in diverse configurations, such as different viewing angles, different scales/zoom, or edges, at one or more of the plurality of viewpoints.

The camera 110 may capture the plurality of image frames from the plurality of viewpoints. Similarly, the LiDAR sensor 108 may scan the calibration pattern 112 from the plurality of viewpoints and generate a plurality of PCD frames based on the scan of the calibration pattern 112 from the plurality of viewpoints. Each PCD frame may include a plurality of points that together represent at least a portion of the surrounding environment in 3D space. As an example, each point may be represented as x, y, z, r, g, b, a, where (x, y, z) may represent 3D coordinates of a point, (r, g, and b) may represent red, green, and blue values of the point, and (a) may represent the transparency value associated with the point.

The plurality of points may be sampled from object(s) (e.g., including the calibration pattern 112) in the surrounding environment and may define a geometry and attributes of the object(s) in the 3D space. For example, the attributes may include a color, a texture, a reflectance, a transparency, or a surface normal. In at least one embodiment, the plurality of points may collectively define a spatially sampled surface of the object(s) and in some instances, a spatially sampled volume of the object(s). For example, for a transparent or a semi-transparent object, each point cloud frame may include surface points as well as inner points that lie below the surface of the transparent or the semi-transparent object.

As part of the process, the calibration system 102 may receive the plurality of image frames from the camera 110 and the plurality of PCD frames from the LiDAR sensor 108. The calibration of the sensor system 106 may include operations related to camera calibration and LiDAR to camera calibration. For example, at first, intrinsic calibration of the camera 110 may be performed, which may be followed by calibration of the LiDAR sensor 108 with the camera 110 (i.e. pre-calibrated). Operations to perform the calibration of the LiDAR sensor 108 with the camera 110 may include computations of extrinsic calibration parameters (e.g., a rotation matrix and a translation vector), as briefly described herein.

The calibration system 102 may extract a first normal to a first plane of the calibration pattern 112 in a first PCD frame of the plurality of PCD frames. In at least one embodiment, for the first PCD frame, the calibration system 102 may determine the first plane based on an input (e.g., a user input). The input may correspond to annotation of at least three points from a set of points sampled from the surface of the calibration pattern 112 in the first PCD frame. The extracted first normal may indicate a relative orientation of the calibration pattern 112 (or the first plane) with respect to an image plane of the LiDAR sensor 108. The calibration system 102 may further extract a second normal to a second plane of the calibration pattern 112 in a first image frame of the plurality of image frames. Similar to the extracted first normal, the extracted second normal may also indicate a relative orientation of the calibration pattern 112 with respective to an image plane of the camera 110. Both the first normal and the second normal may be extracted by use of conventional mathematical methods, for example, using plane fitting methods which are well known to one ordinarily skilled in the art.

The calibration system 102 may compute a transform between the extracted first normal and the extracted second normal as a correspondence between the LiDAR sensor 108 and the camera 110. The computed transform may include final values of the extrinsic calibration parameters for the sensor system 106. Based on the computed transform, the calibration system 102 may calibrate the LiDAR sensor 108 with camera 110. Alternatively, in some embodiments, the calibration system 102 may transmit the extrinsic calibration parameters to the ECU 104a of the vehicle 104. The ECU 104a may calibrate the LiDAR sensor 108 with the camera 110 based on the final values of extrinsic calibration parameters. In such instances, the LiDAR sensor 108 may be calibrated while the sensor system 106 is mounted on the vehicle 104 and the vehicle 104 is in an operational state.

By way of example, the final values of the extrinsic calibration parameters may include a rotation matrix and a translation vector that may be loaded as a computer-readable file on the sensor system 106 or on the ECU 104a of the vehicle 104. In live usage, the sensor system 106 or the ECU 104a of the vehicle 104 may use the computer-readable file to establish a 3D-2D correspondence between a PCD frame from the LiDAR sensor 108 and a respective image frame from the camera 110. Operations related to the calibration of the sensor system 106 by the disclosed calibration system 102 are explained further in detail, for example, in FIG. 5.

Figure 2:
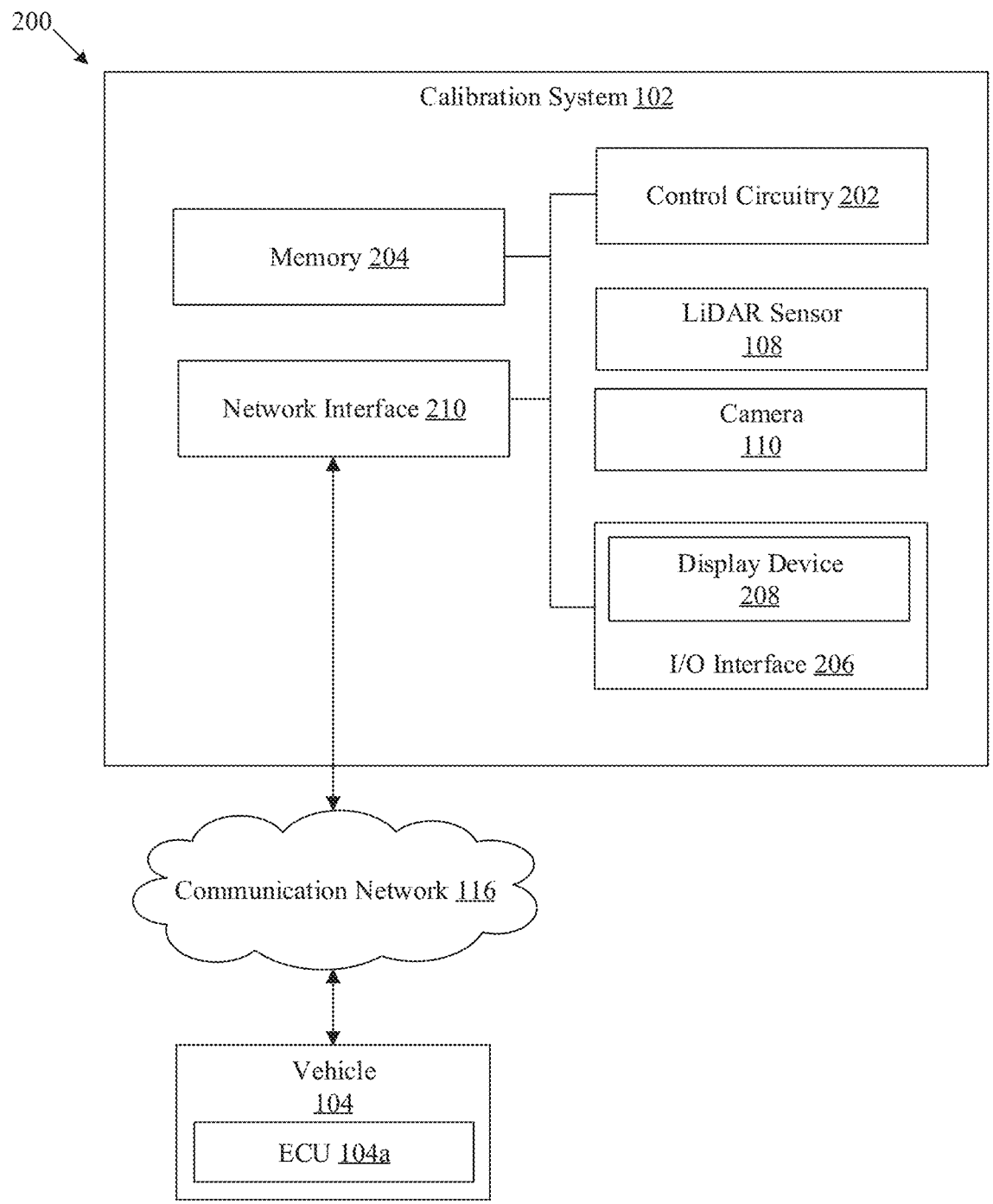
FIG. 2 is a block diagram that illustrates an exemplary implementation of a calibration system for LiDAR-camera calibration, in accordance with an embodiment of the disclosure.

FIG. 2 is a block diagram that illustrates an exemplary implementation of a calibration system for LiDAR-camera calibration, in accordance with an embodiment of the disclosure. FIG. 2 is explained in conjunction with elements from FIG. 1. With reference to FIG. 2, there is shown a block diagram 200 of the calibration system 102. The calibration system 102 may include control circuitry 202, a memory 204, and an input/output (I/O) interface 206, a display device 208, and a network interface 210. In the exemplary implementation, the calibration system 102 may include the sensor system 106 (which includes the LiDAR sensor 108 and the camera 110).

The control circuitry 202 may include suitable logic, circuitry, and/or interfaces that may be configured to execute program instructions associated with different operations to be executed by the calibration system 102. The control circuitry 202 may include any suitable special-purpose or general-purpose computer, computing entity, or processing device including various computer hardware or software modules and may be configured to execute instructions stored on any applicable computer-readable storage media. For example, the control circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the control circuitry 202 may include any number of processors configured to, individually or collectively, perform or direct performance of any number of operations of the calibration system 102, as described in the present disclosure. Additionally, one or more of the processors may be present on one or more different electronic devices, such as different servers. In some embodiments, the control circuitry 202 may be configured to interpret and/or execute program instructions and/or process data stored in the memory 204 and/or a persistent data storage. In some embodiments, the control circuitry 202 may fetch program instructions from a persistent data storage and load the program instructions in the memory 204. After the program instructions are loaded into the memory 204, the control circuitry 202 may execute the program instructions. Some of the examples of the control circuitry 202 may be a Graphical Processing Unit (GPU), a Central Processing Unit (CPU), a Reduced Instruction Set Computer (RISC) processor, an Application-Specific Integrated Circuit (ASIC) processor, a Complex Instruction Set Computer (CISC) processor, a co-processor, and/or a combination thereof.

The memory 204 may include suitable logic, circuitry, interfaces, and/or code that may be configured to store the program instructions executable by the control circuitry 202. In certain embodiments, the memory 204 may be configured to store operating systems and associated application-specific information. The memory 204 may include computer-readable storage media for carrying or having computer-executable instructions or data structures stored thereon. Such computer-readable storage media may include any available media that may be accessed by a general-purpose or a special-purpose computer, such as the control circuitry 202. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the control circuitry 202 to perform a certain operation or a group of operations associated with the calibration system 102.

The I/O interface 206 may include suitable logic, circuitry, and interfaces that may be configured to receive a user input and provide an output based on the received input. The I/O interface 206 which includes various input and output devices, may be configured to communicate with the control circuitry 202. Examples of the I/O interface 206 may include, but are not limited to, a touch screen, a keyboard, a mouse, a joystick, a microphone, a display (such as the display device 208), and a speaker.

The display device 208 may include suitable logic, circuitry, and interfaces that may be configured to display information related to the calibration of the sensor system 106. Such information may include, for example, image frames, PCD frames, annotated PCD frames, and the like. The display device 208 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 208 may refer to a display of the infotainment head unit, a projection-based display, a see-through display, and/or an electro-chromic display.

The network interface 210 may include suitable logic, circuitry, interfaces, and/or code that may enable communication among the calibration system 102 and other external devices, such as the vehicle 104 and the server 114, via the communication network 116. The network interface 210 may implement known technologies to support wired and/or wireless communication via the communication network 116. The network interface 210 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 210 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions or operations executed by the calibration system 102, as described in FIG. 1, may be performed by the control circuitry 202. Operations executed by the control circuitry 202 are described in detail, for example, in the FIG. 5.

Figure 3:
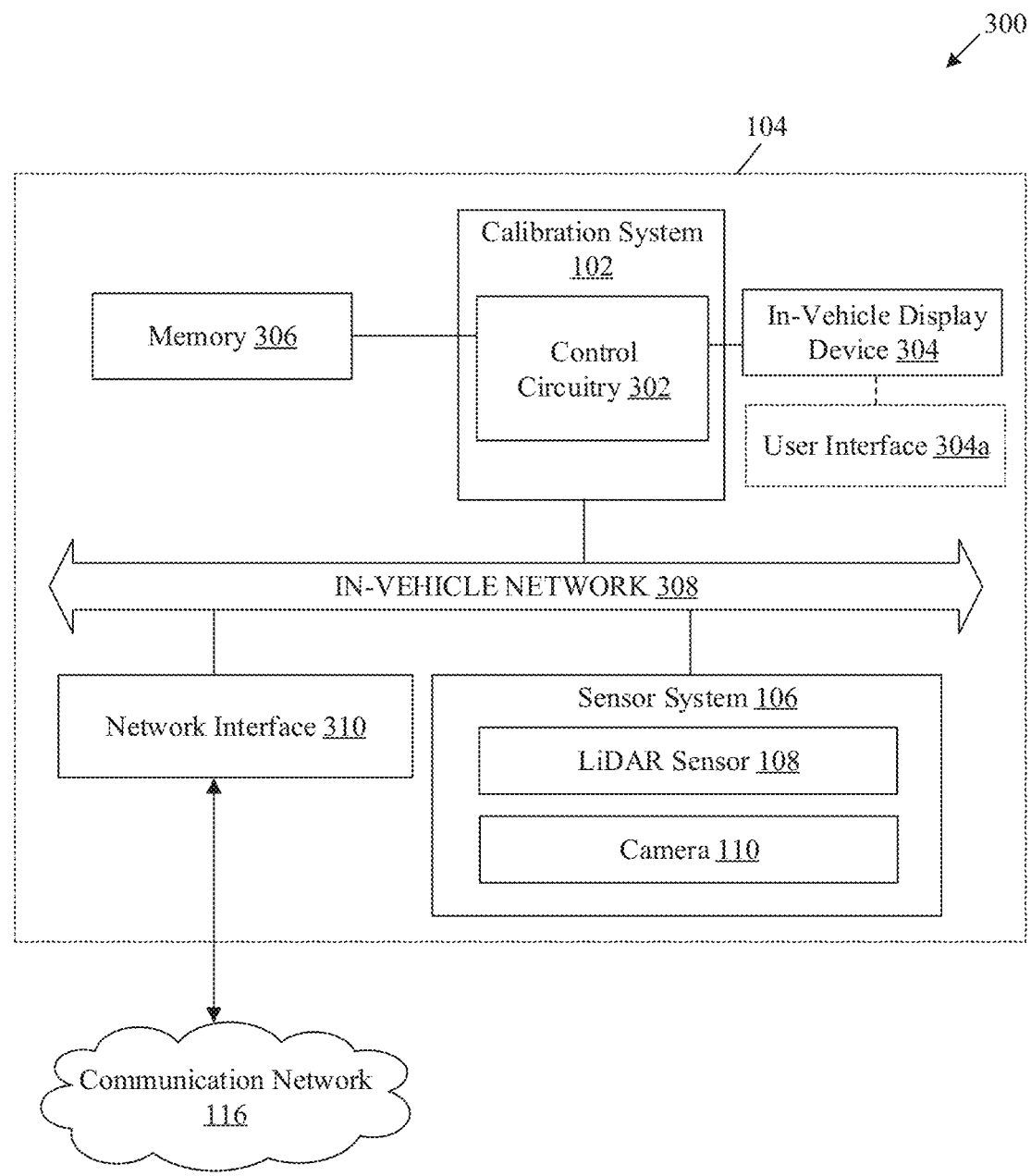
FIG. 3 is a block diagram that illustrates an exemplary implementation of a calibration system in an exemplary vehicle, in accordance with an embodiment of the disclosure.

FIG. 3 is a block diagram that illustrates an exemplary implementation of a calibration system in an exemplary vehicle, in accordance with an embodiment of the disclosure. FIG. 3 is explained in conjunction with elements from FIG. 1. With reference to FIG. 3, there is shown a block diagram 300 of the vehicle 104. The block diagram 300 of the vehicle 104 may include the calibration system 102 which may be implemented as part of an In-vehicle Infotainment (IVI) system or as an ECU (which may include at least a microprocessor and/or a memory). The vehicle 104 may further include control circuitry 302 as part of the calibration system 102, the sensor system 106 (which includes the LiDAR sensor 108 and the camera 110), an in-vehicle display device 304, and a memory 306 communicatively coupled to the control circuitry 302. In some embodiments, the in-vehicle display device 304 may be a part of an infotainment head unit (not shown in FIG. 3). One or more user interfaces (UIs), such as a UI 304a may be rendered on the in-vehicle display device 304. The control circuitry 302 may communicate with the sensor system 106, via an in-vehicle network 308. The vehicle 104 may further include a network interface 310 that may establish the communication network 116 between the vehicle 104 and other external devices, such as the server 114. A person of ordinary skilled in the art will understand that the vehicle 104 may also include other suitable components or systems, in addition to the components or systems illustrated herein to describe and explain the function and operation of the present disclosure. Description of such components or systems is omitted herein for the sake of brevity.

The control circuitry 302 may include suitable logic, circuitry, and/or interfaces that may be configured to execute program instructions associated with different operations to be executed by the calibration system 102. The control circuitry 302 may include any suitable special-purpose or general-purpose computer, computing entity, or processing device including various computer hardware or software modules and may be configured to execute instructions stored on any applicable computer-readable storage media. For example, the control circuitry 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 3, the control circuitry 302 may include any number of processors configured to, individually or collectively, perform or direct performance of any number of operations of the calibration system 102, as described in the present disclosure. Additionally, one or more of the processors may be present on one or more different electronic devices, such as different servers. In some embodiments, the control circuitry 302 may be configured to interpret and/or execute program instructions and/or process data stored in a memory and/or a persistent data storage. In some embodiments, the control circuitry 302 may fetch program instructions from a persistent data storage and load the program instructions in memory. After the program instructions are loaded into the memory, the control circuitry 302 may execute the program instructions. Some of the examples of the control circuitry 302 may be a GPU, a CPU, a RISC processor, an ASIC processor, a CISC processor, a co-processor, and/or a combination thereof.

The in-vehicle display device 304 may include suitable logic, circuitry, interfaces, and/or code that may be configured to render various types of information and/or viewable content via the UI 304a. The UI 304a may be a customizable or a non-customizable Graphical UI that may display various types of information related to the calibration system 102. Examples of the in-vehicle display device 304 may include, but are not limited to, a display of the infotainment head unit, a projection-based display, a see-through display, and/or an electro-chromic display.

The memory 306 may include suitable logic, circuitry, interfaces, and/or code that may be configured to store the program instructions executable by the control circuitry 302. In certain embodiments, the memory 306 may be configured to store operating systems and associated application-specific information. The memory 306 may include computer-readable storage media for carrying or having computer-executable instructions or data structures stored thereon. Such computer-readable storage media may include any available media that may be accessed by a general-purpose or a special-purpose computer, such as the control circuitry 302. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the control circuitry 302 to perform a certain operation or a group of operations associated with the calibration system 102.

The in-vehicle network 308 may include a medium through which the various control units, components, and/or systems of the vehicle 104 may communicate with each other. In accordance with an embodiment, in-vehicle communication of audio/video data may occur by use of Media Oriented Systems Transport (MOST) multimedia network protocol of the in-vehicle network 308 or other suitable network protocols for vehicle communication. The MOST-based network may be a separate network from the controller area network (CAN). In accordance with an embodiment, the MOST-based network, the CAN, and other in-vehicle networks may co-exist in the vehicle 104. The in-vehicle network 308 may facilitate access control and/or communication among the control circuitry 302, the sensor system 106, and other ECUs, such as Engine Control Module (ECM) or a telematics control unit (TCU) of the vehicle 104.

Various devices or components in the vehicle 104 may connect to the in-vehicle network 308, in accordance with various wired and wireless communication protocols. Examples of the wired and wireless communication protocols for the in-vehicle network 308 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit ($I^2C$), Inter Equipment Bus (IEBus), Society of Automotive Engineers (SAE) J1708, SAE J1939, International Organization for Standardization (ISO) 11992, ISO 11783, Media Oriented Systems Transport (MOST), MOST25, MOST50, MOST150, Plastic optical fiber (POF), Power-line communication (PLC), Serial Peripheral Interface (SPI) bus, and/or Local Interconnect Network (LIN).

The network interface 310 may communicate via wired and/or wireless communication with networks, such as the Internet, an Intranet and/or a wireless network, such as a cellular telephone network, a wireless local area network (LAN) and/or a metropolitan area network (MAN). The communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g, IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Some or all of the functions and/or operations performed by the control circuitry 202 (as described in FIG. 2) may be performed by the control circuitry 302, without a deviation from the scope of the disclosure.

Figure 4:
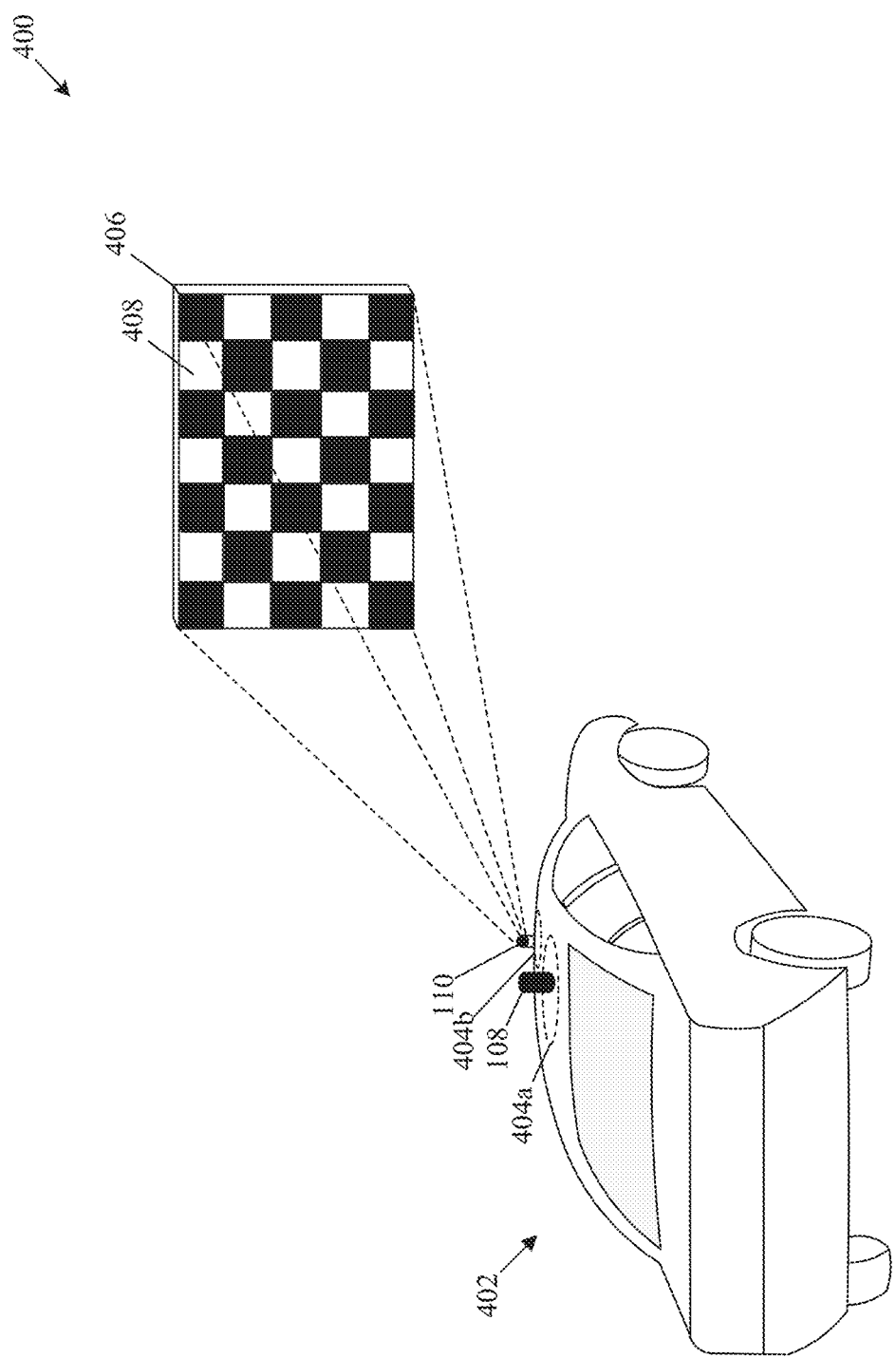
FIG. 4 is diagram that illustrates an exemplary scenario for acquisition of sensor information via a sensor system on a vehicle, in accordance with an embodiment of the disclosure.

FIG. 4 is diagram that illustrates an exemplary scenario for acquisition of sensor information via a sensor system on a vehicle, in accordance with an embodiment of the disclosure. FIG. 4 is explained in conjunction with elements from FIG. 1, 2, or 3. With reference to FIG. 4, there is shown a diagram 400. In the diagram 400, there is shown a vehicle 402 that includes the sensor system 106 mounted on the vehicle 402. As shown, for example, the sensor system 106 may include the LiDAR sensor 108 mounted on a top portion 404a of the vehicle 402 and the camera 110 mounted at a front facing portion 404b of the vehicle 402. There is further shown a board 406 onto which a checkerboard pattern 408 (i.e. the calibration pattern 112) is printed. The board 406 may be placed in front of the vehicle 402 such that it lies in a combined FOV of the LiDAR sensor 108 and the camera 110. Herein, the position of the LiDAR sensor 108 may be assumed to be fixed with respect to the position of the camera 110. Before the process of calibration can be initialized, an operator, for example, a technician, may be tasked to hold the board 406 at different positions with respect to the vehicle 402 while ensuring that the checkerboard pattern 408 stays in the common FOV of the camera 110 and the LiDAR sensor 108 at all the different positions. These positions may facilitate the sensor system 106 to acquire sensor information (image frames and PCD frames) from a diverse range of viewpoints which constitutes diverse viewing angles, scales/zoom values, orientations, and the like.

At each position of the board 406, the LiDAR sensor 108 may scan object(s) including the checkerboard pattern 408 to generate a PCD frame. The PCD frame may include points which are sampled from surface/volume (if transparent/semi-transparent) of the object(s) in the FOV of the LiDAR sensor 108. Similarly, at each position of the board 406, operations of the camera 110 may be time-synchronized with that of the LiDAR sensor 108 to capture an image frame that includes the checkerboard pattern 408. For all the different positions, the sensor system 106 may share a plurality of image frames and a plurality of PCD frames with the calibration system 102, via the communication network 116 or the in-vehicle network 308.

Although, FIG. 4 shows a particular arrangement of the LiDAR sensor 108 and the camera 110 on a four-wheeler vehicle; however, the disclosure may not be so limiting and the present disclosure may also be applicable to other type of vehicles and in other configurations, such as, in position or in number of the LiDAR sensor 108 and the camera 110 on other type of vehicles.

Figure 5:
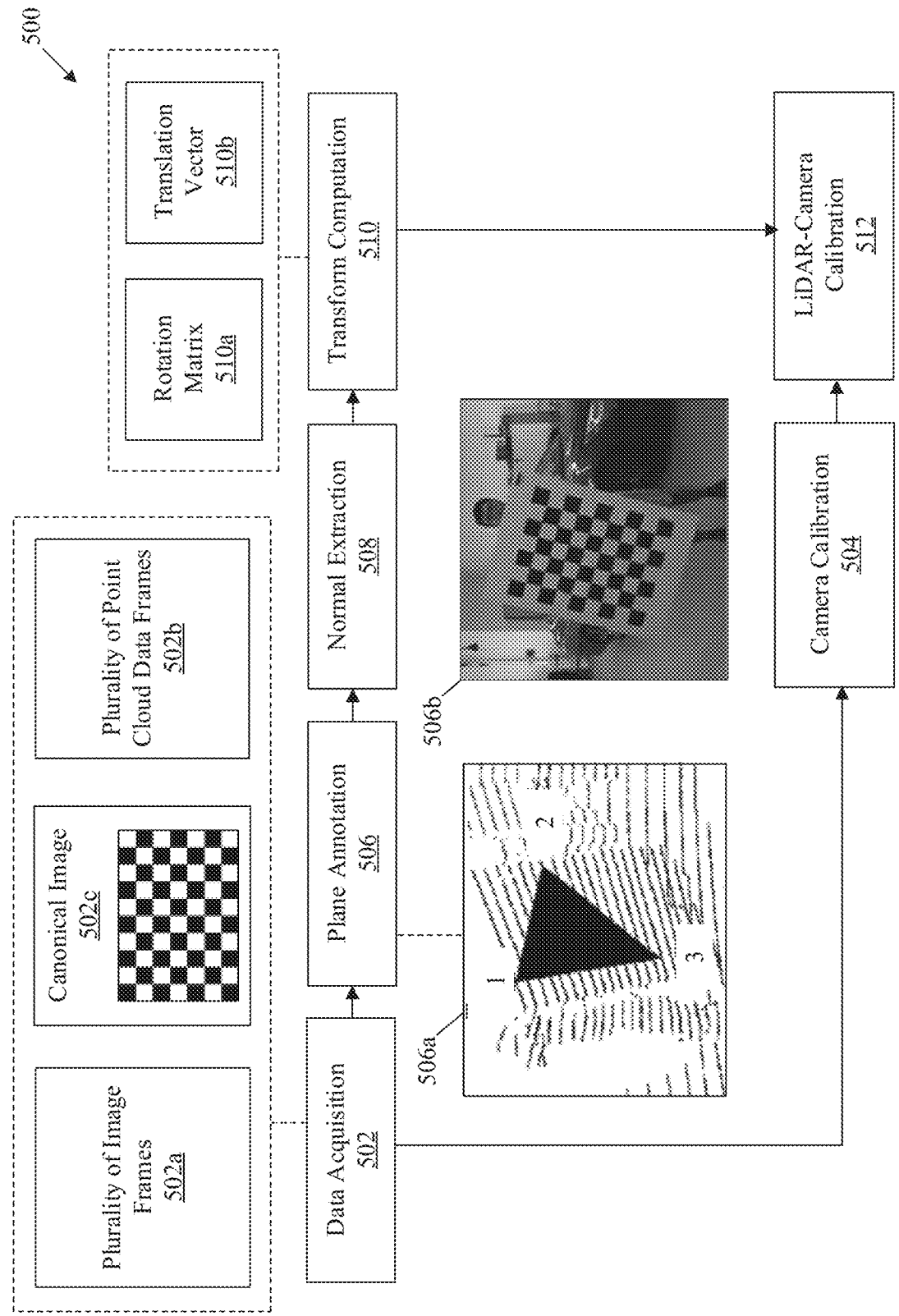
FIG. 5 is a diagram that illustrates exemplary operations for LiDAR-camera calibration, in accordance with an embodiment of the disclosure.

FIG. 5 is a diagram that illustrates exemplary operations for LiDAR-camera calibration, in accordance with an embodiment of the disclosure. FIG. 5 is explained in conjunction with elements from FIGS. 1, 2, 3, and 4. With reference to FIG. 5, there is shown a diagram 500 to depict exemplary operations from 502 to 512 for calibration of the sensor system 106 of FIG. 1. The exemplary operations illustrated in the diagram 500 may start at 502 and may be performed by any computing system, apparatus, or device, such as by the calibration system 102 of FIG. 1, FIG. 2, or FIG. 3. Although illustrated with discrete blocks, the operations associated with one or more of the blocks of the diagram 500 may be divided into additional blocks, combined into fewer blocks, or eliminated, depending on the particular implementation.

At 502, data acquisition process may be performed. As part of the data acquisition process, the calibration system 102 may receive, from the sensor system 106, a plurality of image frames 502a and a plurality of PCD frames 502b. Herein, at each viewpoint, the calibration pattern 112 may be arranged at a particular viewing angle, orientation, and/or distance with respect to a position of the LiDAR sensor 108 and the camera 110. Therefore, in order to ensure that both the LiDAR sensor 108 and the camera 110 scan the calibration pattern 112 simultaneously, the operation of the LiDAR sensor 108 and the camera 110 may be controlled (or pre-configured/pre-programmed) so that the data acquisition is time-synchronized for every viewpoint. For example, while the camera 110 captures an image frame of the surrounding environment from a particular FOV, the LiDAR sensor 108 may simultaneously scan (e.g., from a 360° FOV using a rotating scanner unit) the surrounding environment to produce a PCD frame, as also described in FIG. 1 and FIG. 4. In at least one embodiment, the calibration system 102 may also store a canonical image 502c of the calibration pattern 112 in memory (e.g., the memory 204).

At 504, camera calibration may be performed. For camera calibration, the calibration system 102 may estimate final values of intrinsic calibration parameters for the camera 110 based on the received plurality of image frames 502a and the canonical image 502c of the calibration pattern 112. For instance, using the canonical image 502c as reference and the received plurality of image frames 502a, the calibration system 102 may solve an objective function for intrinsic camera calibration to compute the final values of the intrinsic calibration parameters for the camera 110. The final values of the intrinsic calibration parameters may represent a projective transformation from three-dimensional (3D) coordinates of the camera 110 into two-dimensional (2D) image coordinates of the plurality of the image frames 502a. The intrinsic calibration parameters may be associated with properties, for example, optical center of the lens of the camera 110 as a principal point, a focal length of the lens as a skew coefficient, distortion of the lens, and the like. Based on the final values of the intrinsic calibration parameters, the calibration system 102 may calibrate the camera 110. The intrinsic camera calibration of the camera 110 may suppress effect of lens distortion on images that may be captured by the calibrated camera 110. Additionally, the intrinsic camera calibration may correct manufacturing defects, such as camera axis skew and camera center misalignment.

At 506, plane annotation may be performed. For plane annotation, the calibration system 102 may control the display device 208 to display a plurality of points of a first PCD frame 506a of the plurality of PCD frames 502b. Herein, the FOV of the first PCD frame 506a may be same as that of a first image frame 506b of the plurality of image frames 502a. A user, for example, a technician, may be allowed to provide a user input to select three or more points associated with the calibration pattern 112 in the first PCD frame 506a. The calibration system 102 may receive the user input as a selection of the three or more points from the displayed plurality of points, such as selected points "1", "2", and "3" of the first PCD frame 506a. Such a selection may correspond to annotation of points which may be later used to extract a first plane of the calibration pattern 112 in the first PCD frame 506a.

The calibration system 102 may determine the first plane of the calibration pattern 112 in the first PCD frame 506a based on the selected three or more points from the first PCD frame 506a. For accurate determination of the first plane, it may be desirable to select points which are spread apart from each other and are closer to the edge of the calibration pattern 112. The calibration system 102 may further control the display device to highlight an area (representing the first plane) enclosed by lines joining the selected three or more points, for example a triangular region as formed based on connection of selected points 1, 2, and 3 of the first PCD frame 506a.

At 508, normal extraction may be performed. For normal extraction, the calibration system 102 may extract a first normal to the determined first plane of the calibration pattern 112 in the first PCD frame 506a. Similarly, the calibration system 102 may determine a second plane of the calibration pattern 112 in the first image frame 506b and extract the second normal to the determined second plane of the calibration pattern 112.

At 510, transform computation may be performed. For transform computation, the calibration system 102 may compute a transform between the extracted first normal and the extracted second normal to determine final values of the extrinsic calibration parameters for the sensor system 106. Based on the final values of the extrinsic calibration parameters, a correspondence may be established between every point of a PCD frame from the LiDAR sensor 108 and respective pixels of an image frame from the camera 110. The final values of the extrinsic calibration parameters may include a rotation matrix 510a and a translation vector 510b from a LiDAR frame (i.e. a PCD frame) to a camera frame (i.e. an image frame).

For example, the final values (x) of the extrinsic calibration parameters may include the rotation matrix 510a and the translation vector 510b, as follows:

$$x=[r_x, r_y, r_z, t_x, t_y, t_z]$$

Where, $r_x$, $r_y$, and $r_z$ may represent the rotation matrix 510a for a 3D point [x, y, z] on the first plane; and $t_x$, $t_y$, and $t_z$ may represent the translation vector 510b for a 3D point [x, y, z] on the first plane.

At first, in order to compute the transform to determine the final values of the extrinsic calibration parameters, the calibration system 102 may initialize values of the extrinsic calibration parameters with seed values. Also, the calibration system 102 may determine a distance between the calibration pattern 112 and a position of the camera 110. Based on the initialized values of the extrinsic calibration parameters, the calibration system 102 may compute a dot product between the extracted first normal and the extracted second normal. After computation of the dot product, the calibration system 102 may compute a value of an objective function based on the computed dot product and a square of the determined distance between the calibration pattern 112 and the camera 110.

For example, an objective function between the dot product and the square of the determined distance may be established using equation (1), as follows:

$$\text{dot}(OP_I, \text{Normal}) - \text{dist}_{O_{plane}}^2 = 0 \quad (1)$$

Where,
$P_I$ represents one of the three points annotated manually on the plane,
$OP_I$ is the line connecting origin and $P_I$,
$\text{dist}_{o\_plane}$ is the distance between origin and the plane. It is estimated from camera image (i.e. from one of the plurality of image frames 502a) and a known pattern size,
Normal is the surface normal vector of the plane. It is estimated from camera image.

In accordance with an embodiment, the objective function may be formulated as a least square problem which may be solved using methods, for example, Trust Region Reflective (TRR) method, Levenberg-Marquardt method, or Dogleg method. The calibration system 102 may iteratively update the initialized values of the extrinsic calibration parameters until the computed value of the objective function is below a threshold value. When the computed value of the objective function is below the threshold value, the updated values of the extrinsic calibration parameters may be considered as the final values of the extrinsic calibration parameters.

At 512, LiDAR-camera calibration may be performed. Once the camera 110 is calibrated based on the intrinsic calibration parameters, the calibration system 102 may calibrate the LiDAR sensor 108 with the calibrated camera 110 based on the final values of the extrinsic calibration parameters. In at least one embodiment, the calibration system 102 may transmit the final values of the extrinsic calibration parameters to the ECU 104a of the vehicle 104. While the sensor system 106 is mounted on the vehicle 104, the ECU 104a may calibrate the LiDAR sensor 108 with the calibrated camera 110 based on the final values of the extrinsic calibration parameters.

The LiDAR sensor 108 may be calibrated with the camera 110 while the sensor system 106 is mounted on the vehicle 104 and the vehicle 104 is in a non-operational state. For example, operations related to the LiDAR-camera calibration at 512 may be executed in a factory setup at a time of assembly of the sensor system 106 on the vehicle 104. Alternatively, in some embodiments, the vehicle 104 may be in an operational state when the LiDAR sensor 108 is calibrated with the camera 110.

Although the diagram 500 is illustrated as discrete operations, such as 502, 504, 506, 508, 510, and 512, however, in certain embodiments, such discrete operations may be further divided into additional operations, combined into fewer operations, or eliminated, depending on the particular implementation without detracting from the essence of the disclosed embodiments.

Figure 6:
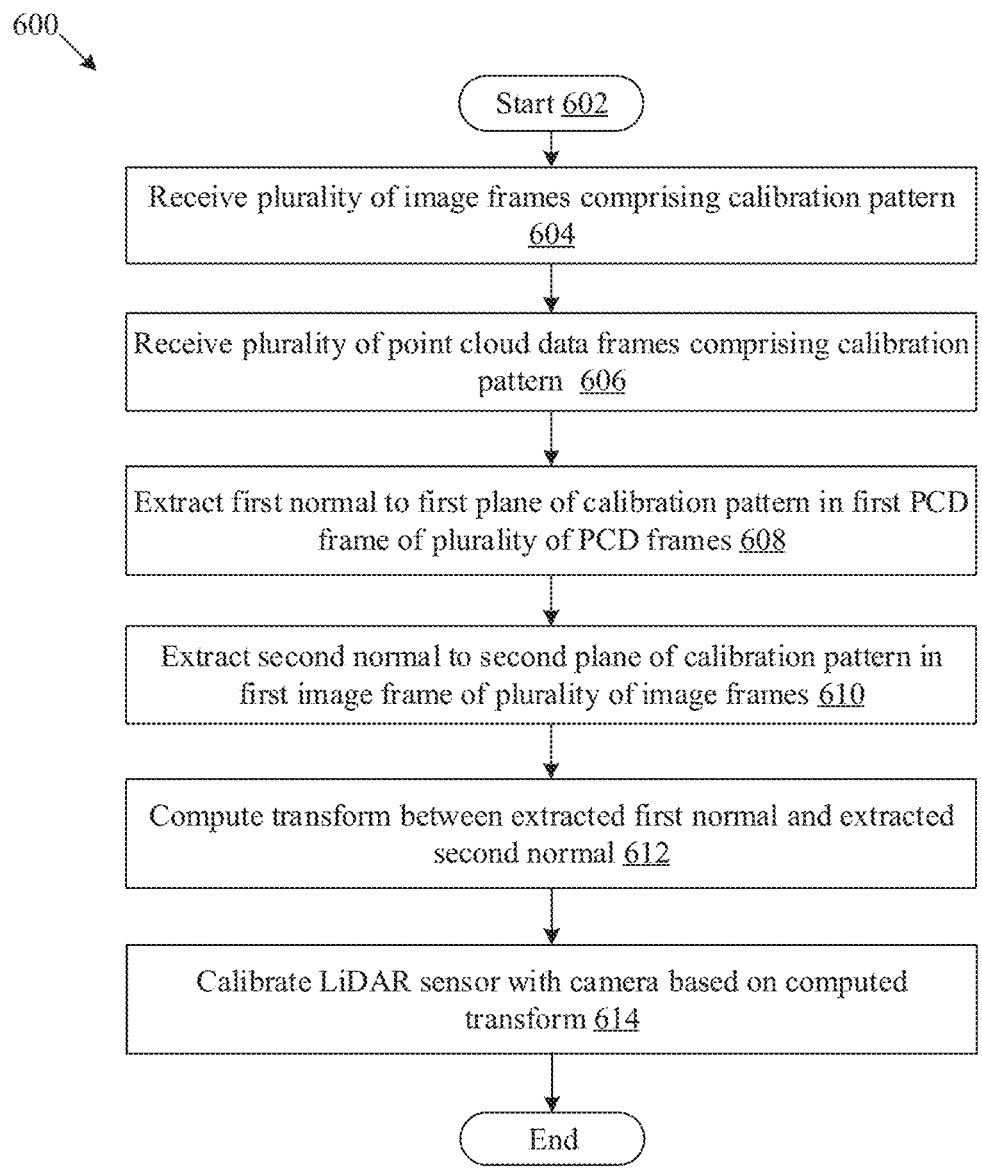
FIG. 6 illustrates a flowchart of an exemplary method for LiDAR-camera calibration, in accordance with an embodiment of the disclosure.

FIG. 6 illustrates a flowchart of an exemplary method for LiDAR-camera calibration, in accordance with an embodiment of the disclosure. FIG. 6 is explained in conjunction with elements from FIGS. 1, 2, 3, 4, and 5. With reference to FIG. 6, there is shown a flowchart 600. The method illustrated in the flowchart 600 may start at 602 and proceed to 604. The method illustrated in the flowchart 600 may be performed by any computing system, apparatus, or device, such as by the calibration system 102 or the ECU 104a of the vehicle 104.

At 604, the plurality of image frames 502a including the calibration pattern 112 may be received. In at least one embodiment, the calibration system 102 may receive, from the camera 110, the plurality of image frames 502a that includes the calibration pattern 112. The plurality of image frames 502a may be captured by the camera 110 from the plurality of viewpoints.

At 606, the plurality of PCD frames 502b including the calibration pattern 112 may be received. In at least one embodiment, the calibration system 102 may receive, from the LiDAR sensor 108, the plurality of PCD frames 502b that may include the calibration pattern 112. The plurality of PCD frames 502b may be scanned by the LiDAR sensor 108 from the plurality of viewpoints.

At 608, a first normal to a first plane of the calibration pattern 112 in the first PCD frame 506a of the plurality of PCD frames 502b may be extracted. In at least one embodiment, the calibration system 102 may extract the first normal to the first plane of the calibration pattern 112 in the first PCD frame 506a of the plurality of PCD frames 502b.

At 610, a second normal to a second plane of the calibration pattern 112 in the first image frame 506b of the plurality of image frames 502a may be extracted. In at least one embodiment, the calibration system 102 may extract the second normal to the second plane of the calibration pattern 112 in the first image frame 506b of the plurality of image frames 502a.

At 612, a transform between the extracted first normal and the extracted second normal may be computed. The computed transform may include final values of extrinsic calibration parameters for the sensor system 106. In at least one embodiment, the calibration system 102 may compute the transform between the extracted first normal and the extracted second normal.

At 614, the LiDAR sensor 108 may be calibrated with the camera 110 based on the computed transform. In at least one embodiment, the calibration system 102 may calibrate the LiDAR sensor 108 with the camera 110 based on the computed transform. Control may pass to end.

The flowchart 600 is illustrated as discrete operations, such as 604, 606, 608, 610, 612, and 614. However, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Reference will now be made in detail to specific aspects or features, examples of which are illustrated in the accompanying drawings. Wherever possible, corresponding or similar reference numbers will be used throughout the drawings to refer to the same or corresponding parts.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A calibration system, comprising:
control circuitry communicatively coupled to a sensor system comprising a Light Detection and Ranging (LiDAR) sensor and a camera,
wherein the control circuitry is configured to:
receive a plurality of image frames comprising a calibration pattern;
receive a plurality of point cloud data (PCD) frames comprising the calibration pattern;

extract a first normal to a first plane of the calibration pattern in a first PCD frame of the received plurality of PCD frames;

extract a second normal to a second plane of the calibration pattern in a first image frame of the received plurality of image frames;

compute a transform between the extracted first normal and the extracted second normal,
   wherein the computed transform comprises final values of extrinsic calibration parameters for the sensor system; and calibrate the LiDAR sensor with the camera based on the computed transform.

2. The calibration system according to claim 1, further comprising the sensor system, wherein
the camera is configured to capture the plurality of image frames from a plurality of viewpoints, and
the LiDAR sensor is configured to:
   scan the calibration pattern from the plurality of viewpoints; and
   generate the plurality of PCD frames based on the scan of the calibration pattern from the plurality of viewpoints.

3. The calibration system according to claim 1, wherein the control circuitry is further configured to:
estimate final values of intrinsic calibration parameters of the camera based on the plurality of image frames of the calibration pattern and a canonical image of the calibration pattern; and
calibrate the camera based on the estimated final values of the intrinsic calibration parameters.

4. The calibration system according to claim 3, wherein the control circuitry is further configured to calibrate the LiDAR sensor with the calibrated camera based on the computed transform.

5. The calibration system according to claim 1, wherein the control circuitry is further configured to determine a distance between the calibration pattern and a position of the camera.

6. The calibration system according to claim 5, wherein the control circuitry is further configured to:
initialize values of the extrinsic calibration parameters with seed values;
compute a dot product between the extracted first normal and the extracted second normal based on the initialized values of the extrinsic calibration parameters;
compute a value of an objective function based on the computed dot product and a square of the determined distance; and
update the initialized values of the extrinsic calibration parameters until the computed value of the objective function is below a threshold,
   wherein when the computed value of the objective function is below the threshold, the updated values of the extrinsic calibration parameters are the final values of the extrinsic calibration parameters.

7. The calibration system according to claim 6, wherein the objective function is based on one of Trust Region Reflective (TRR) method, Levenberg-Marquardt method, or dogleg method.

8. The calibration system according to claim 1, wherein the extrinsic calibration parameters comprise a rotation matrix and a translation vector for the sensor system.

9. The calibration system according to claim 1, wherein the calibration pattern is a checkerboard pattern.

10. The calibration system according to claim 1, wherein a position of the LiDAR sensor is fixed with respect to the camera.

11. The calibration system according to claim 1, wherein each PCD frame of the plurality of PCD frames includes a plurality of points that represents the calibration pattern, and
the control circuitry is further configured to:
select at least three points from the first PCD frame, wherein a Field-of-View (FOV) of the first PCD frame is same as that of the first image frame;
determine the first plane based on the selected at least three points; and
extract the first normal to the determined first plane.

12. The calibration system according to claim 11, wherein the control circuitry is further configured to:
receive a user input; and
select at least three points from the first PCD frame based on the received user input.

13. The calibration system according to claim 1, wherein the control circuitry is further configured to transmit the extrinsic calibration parameters to an Electronic Control Unit (ECU) of a vehicle, and
wherein, while the sensor system in mounted on the vehicle, the ECU is configured to calibrate the LiDAR sensor with the camera based on the extrinsic calibration parameters.

14. A calibration system, comprising:
a sensor system that comprises a Light Detection and Ranging (LiDAR) sensor and a camera; and
control circuitry communicatively coupled to the sensor system, wherein the control circuitry is configured to:
   receive a plurality of image frames comprising a calibration pattern;
   receive a plurality of point cloud data (PCD) frames comprising the calibration pattern;
   extract a first normal to a first plane of the calibration pattern in a first PCD frame of the received plurality of PCD frames;
   extract a second normal to a second plane of the calibration pattern in a first image frame of the received plurality of image frames;
   compute a transform between the extracted first normal and the extracted second normal, wherein the computed transform comprises final values of extrinsic calibration parameters for the sensor system; and
   transmit the extrinsic calibration parameters to an Electronic Control Unit (ECU) of a vehicle,
      wherein the ECU is configured to calibrate the LiDAR sensor with the camera based on the final values of the extrinsic calibration parameters, and
      wherein the LiDAR sensor is calibrated while the sensor system in mounted on the vehicle and the vehicle is in an operational state.

15. A method, comprising:
in a calibration system communicatively coupled to a sensor system comprising a Light Detection and Ranging (LiDAR) sensor and a camera:
   receiving a plurality of image frames comprising a calibration pattern;
   receiving a plurality of point cloud data (PCD) frames comprising the calibration pattern;

extracting a first normal to a first plane of the calibration pattern in a first PCD frame of the received plurality of PCD frames;

extracting a second normal to a second plane of the calibration pattern in a first image frame of the received plurality of image frames;

computing a transform between the extracted first normal and the extracted second normal, wherein the computed transform comprises final values of extrinsic calibration parameters for the sensor system; and calibrating the LiDAR sensor with the camera based on the computed transform.

16. The method according to claim 15, further comprising:

estimating final values of intrinsic calibration parameters of the camera based on the plurality of image frames of the calibration pattern and a canonical image of the calibration pattern; and calibrating the camera based on the estimated final values of the intrinsic calibration parameters.

17. The method according to claim 16, further comprising calibrating the LiDAR sensor with the calibrated camera based on the computed transform.

18. The method according to claim 15, further comprising determining a distance between the calibration pattern and a position of the camera.

19. The method according to claim 18, further comprising:

initializing values of the extrinsic calibration parameters with seed values;

computing a dot product between the extracted first normal and the extracted second normal based on the initialized values of the extrinsic calibration parameters;

computing a value of an objective function based on the computed dot product and a square of the determined distance; and updating the initialized values of the extrinsic calibration parameters until the computed value of the objective function is below a threshold, wherein when the computed value of the objective function is below the threshold, the updated values of the extrinsic calibration parameters are the final values of the extrinsic calibration parameters.

20. The method according to claim 15, further comprising:

selecting at least three points from a plurality of points representing the calibration pattern in the first PCD frame, wherein a Field-of-View (FOV) of the first PCD frame is same as that of the first image frame;

determining the first plane based on the selected at least three points; and extracting the first normal to the determined first plane.

* * * * *